(12) United States Patent
Sato et al.

(10) Patent No.: US 9,102,547 B2
(45) Date of Patent: Aug. 11, 2015

(54) AMMONIA RECOVERY DEVICE AND RECOVERY METHOD

(71) Applicant: MITSUBISHI HEAVY INDUSTRIES, LTD., Tokyo (JP)

(72) Inventors: Fumiaki Sato, Tokyo (JP); Hiroyuki Furuichi, Tokyo (JP); Yudai Kato, Tokyo (JP); Kazuo Ishida, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 141 days.

(21) Appl. No.: 14/070,048

(22) Filed: Nov. 1, 2013

(65) Prior Publication Data

US 2014/0056777 A1 Feb. 27, 2014

Related U.S. Application Data

(62) Division of application No. 12/907,516, filed on Oct. 19, 2010, now Pat. No. 8,603,427.

(30) Foreign Application Priority Data

Oct. 22, 2009 (JP) ................. 2009-243169

(51) Int. Cl.
  *B01D 19/00* (2006.01)
  *B01D 3/14* (2006.01)
  (Continued)

(52) U.S. Cl.
  CPC . *C02F 1/20* (2013.01); *B01D 19/00* (2013.01); *B01D 47/00* (2013.01);
  (Continued)

(58) Field of Classification Search
  CPC ........... B01D 19/00; B01D 3/14; B01D 47/00
  USPC ..................... 96/155, 243; 202/152; 203/91; 208/254 R
  See application file for complete search history.

(56) References Cited

U.S. PATENT DOCUMENTS 4,414,103 A 11/1983 Farrell
4,559,210 A 12/1985 Diemer et al.
(Continued)

FOREIGN PATENT DOCUMENTS

EP 2319805 B1 3/2013
JP 50-130802 A 10/1975
(Continued)

OTHER PUBLICATIONS

European Search Report dated Feb. 4, 2011, issued in corresponding European Patent Application No. 10188430.2.
(Continued)

*Primary Examiner* — Robert A Hopkins
(74) *Attorney, Agent, or Firm* — Westerman, Hattori, Daniels & Adrian, LLP

(57) ABSTRACT

A method includes a first step of, with a $CO_2.H_2S$ stripper maintained to have a pressure higher than atmospheric pressure, from the ammonia-containing wastewater, discharging $CO_2$ and $H_2S$ in a form of gas having a low moisture concentration from a tower top of the $CO_2.H_2S$ stripper while discharging an ammonia-containing solution from a tower bottom of the $CO_2.H_2S$ stripper; a second step of introducing the ammonia-containing solution obtained after the first step into an ammonia stripper which is maintained to have a lower pressure than that of the $CO_2.H_2S$ stripper, and thereby discharging a gas rich in ammonia containing a small amount of $H_2S$ and $CO_2$ from a tower top of the ammonia stripper while discharging water usable as industrial water from a tower bottom of the ammonia stripper; and a third step of introducing the ammonia rich gas obtained after the second step into a washing tower which is maintained to have a lower pressure than that of the ammonia stripper, and thereby discharging a wastewater containing a Na compound from a tower bottom of the washing tower while discharging a $H_2S$-free gas rich in ammonia from a tower top of the washing tower.

1 Claim, 3 Drawing Sheets

(51) Int. Cl.
- *B01D 47/00* (2006.01)
- *C02F 1/20* (2006.01)
- *B01D 53/14* (2006.01)
- *B01D 53/52* (2006.01)
- *B01D 53/62* (2006.01)
- *B01D 53/96* (2006.01)
- *C02F 1/66* (2006.01)
- *C02F 9/00* (2006.01)
- *C02F 101/10* (2006.01)
- *C02F 101/16* (2006.01)

(52) U.S. Cl.
CPC ....... *B01D 53/1418* (2013.01); *B01D 53/1493* (2013.01); *B01D 53/52* (2013.01); *B01D 53/62* (2013.01); *B01D 53/96* (2013.01); *B01D 3/14* (2013.01); *B01D 2252/102* (2013.01); *C02F 1/66* (2013.01); *C02F 9/00* (2013.01); *C02F 2101/101* (2013.01); *C02F 2101/16* (2013.01); *C02F 2301/063* (2013.01); *C02F 2301/066* (2013.01); *C02F 2301/08* (2013.01); *Y02C 10/04* (2013.01)

(56) References Cited

U.S. PATENT DOCUMENTS

| | | |
|---|---|---|
| 7,100,994 B2 | 9/2006 | Vinegar et al. |
| 7,381,389 B2 | 6/2008 | Harada et al. |
| 7,947,168 B2 * | 5/2011 | Machin et al. ............ 208/254 R |
| 2006/0110304 A1 | 5/2006 | Harada et al. |

FOREIGN PATENT DOCUMENTS

| | | |
|---|---|---|
| JP | 55-158119 A | 12/1980 |
| JP | 56-104994 A | 8/1981 |
| JP | 57-180693 A | 11/1982 |
| JP | 58-187489 A | 11/1983 |
| JP | 06-115928 A | 4/1994 |
| JP | 6-102193 B2 | 12/1994 |
| JP | 2004-067849 A | 3/2004 |
| JP | 2004-535481 A | 11/2004 |
| WO | 2004016717 A1 | 2/2004 |

OTHER PUBLICATIONS

European Notice of Allowance dated Oct. 8, 2012, issued in corresponding European Patent Application No. 10 188 430.2, (32 pages).
Canadian Notice of Allowance dated Nov. 28, 2012, issued in corresponding Canadian Patent Application No. 2,717,582, (1 page).
U.S. Non-Final Office Action of U.S. Appl. No. 12/907,516, dated Mar. 15, 2013.
Indonesian Notice of Allowance dated Aug. 27, 2013, issued in corresponding Indonesian Patent Application No. P-00 2010 00670, w/ English translation (4 pages).
Office Action dated Dec. 6, 2013, issued in corresponding Japanese application No. 2009-243169, w/ English translation.
Chinese Notice of Allowance dated Jan. 24, 2014 issued in corresponding Chinese Application No. 201010521237.6 with English Translation. (4 pages).
Notice of Acceptence dated Sep. 22, 2014, issued in corresponding Australian Patent Application No. 2010235896 (2 pages).

\* cited by examiner

AMMONIA RECOVERY DEVICE AND RECOVERY METHOD

CROSS REFERENCE TO RELATED APPLICATIONS

This application is a divisional of U.S. application Ser. No. 12/907,516 filed Oct. 19, 2010, which claims priority to Japanese application No. JP2009-243169, filed Oct. 22, 2009. The contents of these applications are hereby incorporated by reference in their entirety.

BACKGROUND OF THE INVENTION

The present invention relates to an ammonia recovery device and to a recovery method, with which ammonia is recovered together with $CO_2$ and $H_2S$ from an ammonia-containing wastewater from a gasification furnace, such as a coal gasification furnace, using a fossil fuel as a raw material, whereby the purified wastewater is usable as industrial water.

Wastewaters from gasification furnaces, such as coal gasification furnaces, which use a fossil fuel as a raw material, contain ammonia ($NH_3$) as well as $CO_2$, $H_2S$, and the like. Accordingly, in general, an ammonia stripper is operated under atmospheric pressure to release $NH_3$, $CO_2$, and $H_2S$ contained in the wastewaters while water that is reusable as industrial water is recovered from a tower bottom of the ammonia stripper.

H form of a conventional device for recovering ammonia from such a wastewater as described above is shown in FIG. 3. In FIG. 3, an ammonia stripper 301 is operated under atmospheric pressure, and an ammonia-containing wastewater (also containing $CO_2$ and $H_2S$) is introduced through a wastewater supply pipe 302 into this ammonia stripper 301.

The ammonia stripper 301 is maintained at a pressure, measured by a pressure gauge 303, of atmospheric pressure and at a temperature, measured by a thermometer 304, of approximately 90° C. In this case, $NH_3$, $CO_2$, $H_2S$, and water ($H_2O$) are released from the ammonia-containing wastewater; therefore, $NH_3$, $H_2S$, and $CO_2$ gases are discharged from a tower top 305. These $NH_3$, $H_2S$, and $CO_2$ gases are to be served for burning. Furthermore, a wastewater from a tower bottom 306 of the ammonia stripper 301 is used as industrial water.

It should be noted that the $NH_3$ and $H_2S$ gases change as follows:

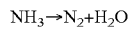

Furthermore, in FIG. 4, another form of a conventional device for recovering ammonia from a wastewater is shown. Note that this form is suggested in the paragraph [0003] of JP 2004-67849 A.

In FIG. 4, an ammonia stripper 401 is generally operated under normal pressure (atmospheric pressure), and an ammonia-containing wastewater (also containing $CO_2$ and $H_2S$) is introduced through a wastewater supply pipe 402 into the ammonia stripper 401. At this time, NaOH is supplied to the wastewater supply pipe 402 from a NaOH supply pipe 407 so that NaOH can be injected into the ammonia-containing wastewater.

The ammonia stripper 401 is maintained at a pressure, measured by a pressure gauge 403, of normal pressure (atmospheric pressure) and a temperature, measured by a thermometer 404, of approximately 90° C. In this case, $NH_3$ and water ($H_2O$) are released from the ammonia-containing wastewater containing NaOH; therefore, $NH_3$ and water ($H_2O$) are discharged from a tower top 405 in the form of an ammonia vapor product.

With the supply of NaOH, the following reactions occur.

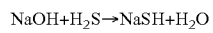

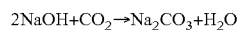

As a result, NaOH, $Na_2CO_3$, NaSH, and water ($H_2O$) are discharged from a tower bottom 406, and then transferred for wastewater treatment.

However, the above-described techniques both have their own drawbacks as follows.

The device for recovering ammonia from a wastewater shown in FIG. 3 has the following problems.

(1) $NH_3$ together with $CO_2$, $H_2S$, water ($H_2O$), and the like discharged from the tower top 305 of the ammonia stripper 301 are burned in an incinerator, and then subjected to flue gas desulfurization. Accordingly, ammonia ($NH_3$) cannot be recovered.

(2) In addition, for the purposes of efficiently releasing ammonia and preventing precipitation of ammonium carbonate, the outlet temperature (the thermometer 304) of the ammonia stripper 301 needs to be maintained at approximately 90° C. This results in an increase in the amount of moisture contained in the gas. Accordingly, although sulfur can be recovered in the form of gypsum during the desulfurization, there arise problems in that the cost increases or in that only dilute sulfuric acid can be recovered, since water separation is essential for a gas used as a raw material gas for production of highly concentrated sulfuric acid (98 wt %).

In addition, the form of the device for recovering ammonia from a wastewater as shown in FIG. 4 has the following problems.

(1) In order to recover ammonia, it is possible to recover a gas rich in $NH_3$ from the tower top 405 by supplying NaOH through the NaOH supply pipe 407 to be mixed into an ammonia-containing wastewater so as to fix $CO_2$ and $H_2S$ by the action of NaOH. However, in such a case, the amount of NaOH to be used is enormous (for example, at a commercial scale of 1000-fold expansion of the laboratory base shown in Table 1, it would be approximately 35 tons per day).

(2) In addition, without the supply of NaOH, water with a quality approximately equivalent to that of industrial water can be obtained from the tower bottom 406 of the ammonia stripper 401. However, when NaOH is added to this water, such a quality that is approximately equivalent to that of industrial water cannot be maintained. Accordingly, thus obtained water needs to be sent to a wastewater treatment facility for treatment to restore a quality approximately equivalent to that of industrial water.

SUMMARY OF THE INVENTION

The present invention has been made in view of the above-described problems in the conventional art. An object of the present invention is to provide a device and a method for recovering ammonia from a wastewater, which are capable of obtaining: a $H_2S$-free ammonia-steam mixture gas having a concentration of 90 wt % or above; water reusable as industrial water; and a $CO_2.H_2S$ rich gas suitable even for production of sulfuric acid.

In order to achieve the above object, an aspect of the present invention provides an ammonia recovery method for recovering ammonia from an ammonia-containing wastewater from a gasification furnace. The ammonia recovery method includes: a first step of, with a $CO_2.H_2S$ stripper maintained to have a pressure higher than atmospheric pressure, from the ammonia-containing wastewater, discharging $CO_2$ and $H_2S$ in a form of gas having a low moisture concentration from a tower top of the $CO_2.H_2S$ stripper while discharging an ammonia-containing solution from a tower bottom of the $CO_2.H_2S$ stripper; a second step of introducing the ammonia-containing solution obtained after the first step into an ammonia stripper which is maintained to have a lower pressure than that of the $CO_2.H_2S$ stripper, and thereby discharging a gas rich in ammonia containing a small amount of $H_2S$ and $CO_2$ from a tower top of the ammonia stripper while discharging water usable as industrial water from a tower bottom of the ammonia stripper; and a third step of introducing the ammonia rich gas obtained after the second step into a washing tower which is maintained to have a lower pressure than that of the ammonia stripper, and thereby discharging a wastewater containing a Na compound from a tower bottom of the washing tower while discharging a $H_2S$-free gas rich in ammonia from a tower top of the washing tower.

Here, the washing tower may include a water washing tower located above and a NaOH washing tower located below which are coupled to each other. Moreover, the third step may include: a NaOH washing step in which the gas rich in ammonia obtained after the second step is introduced into the NaOH washing tower so as to absorb $H_2S$ and $CO_2$ with NaOH contained in a circulation water in the NaOH washing tower and to then send a resultant gas to the water washing tower while discharging a wastewater containing a Na compound from a tower bottom of the NaOH washing tower; and a water washing step in which a make-up water is supplied to the $H_2S$-free gas rich in ammonia subjected to the washing in the NaOH washing step so as to wash dispersion of droplets of NaOH with the make-up water, the water washing step being carried out in the water washing tower maintained to have a lower pressure than that of the ammonia stripper.

Additionally, the wastewater containing a Na compound from the tower bottom of the NaOH washing tower may be injected into a wastewater passage of a scrubber located downstream of the gasification furnace for neutralization.

Furthermore, another aspect of the present invention provides an ammonia recovery device which recovers ammonia from an ammonia-containing wastewater from a gasification furnace. The ammonia recovery device includes: a $CO_2.H_2S$ stripper which has an inner pressure maintained to be higher than atmospheric pressure; an ammonia stripper which has an inner pressure maintained to be lower than that of the $CO_2.H_2S$ stripper; and a washing tower which has an inner pressure maintained to be lower than that of the ammonia stripper. The $CO_2.H_2S$ stripper has: a tower top from which $CO_2$ and $H_2S$ are discharged in a form of a gas having a low moisture concentration from the ammonia-containing wastewater; and a tower bottom from which a solution containing ammonia is discharged. The ammonia stripper has: a tower top from which a gas rich in ammonia is discharged from the solution containing ammonia discharged from the $CO_2.H_2S$ stripper; and a tower bottom from which a water reusable as industrial water is discharged. The washing tower has: a tower bottom from which a wastewater containing a Na compound is discharged; and a tower top from which a $H_2S$-free gas rich in ammonia is discharged.

Here, the washing tower may include a water washing tower located above and a NaOH washing tower located below which are coupled to each other. The NaOH washing tower has: a connecting part through which the gas rich in ammonia from the ammonia stripper is sent to the water washing tower located above the NaOH washing tower after $H_2S$ and $CO_2$ are absorbed with NaOH in a circulating water containing NaOH; and the tower bottom from which the wastewater containing a Na compound is discharged. The water washing tower has a tower top from which the gas rich in ammonia is discharged after a make-up water is supplied to the gas rich in ammonia sent through the connecting part of the NaOH washing tower so as to wash dispersion of droplets of NaOH with the make-up water.

The present invention provides a device and a method for recovering ammonia from an ammonia-containing wastewater, which are capable of obtaining: a $H_2S$-free ammonia-steam mixture gas having a concentration of 90 wt % or above; water reusable as industrial water; and a $CO_2.H_2S$ rich gas suitable even for production of sulfuric acid.

DETAILED DESCRIPTION OF THE PREFERRED EMBODIMENT

Hereinafter, an ammonia recovery device and a recovery method according to the present invention will be described in detail by referring to an embodiment shown in the attached drawings.

Figure 1:
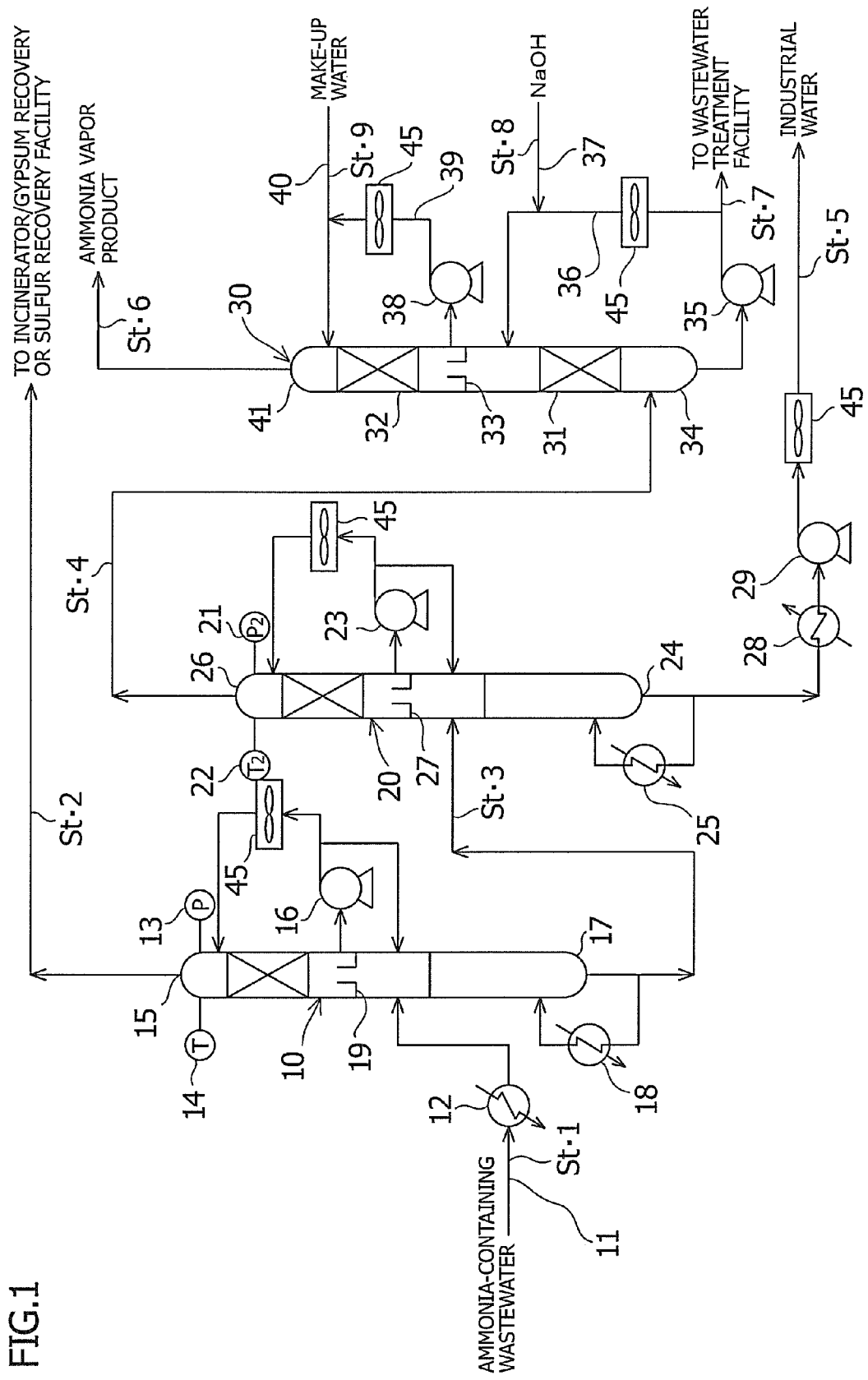
FIG. 1 is a system diagram describing a device for recovering ammonia from an ammonia-containing wastewater according to an embodiment of the present invention.

FIG. 1 shows an embodiment of the ammonia recovery device according to the present invention.

In the embodiment shown in FIG. 1, the main constituents of the device for recovering ammonia from a wastewater are a $CO_2.H_2S$ stripper 10, an ammonia stripper 20, and a washing tower 30 having therein a NaOH washing tower 31 and a water washing tower 32 which are vertically coupled to each other.

The inner pressure of the $CO_2.H_2S$ stripper 10 is maintained to be higher than atmospheric pressure. Specifically, the inner pressure of the $CO_2.H_2S$ stripper 10 is maintained in a range from 2 to 4 $kg/cm^2G$.

In addition, the inner pressure of the ammonia stripper 20 is maintained to be lower than that of the $CO_2.H_2S$ stripper 10. Specifically, the inner pressure of the ammonia stripper 20 is maintained to be lower than that of the $CO_2.H_2S$ stripper 10 and to be in a range from 0.5 to 2 $kg/cm^2G$.

Furthermore, the inner pressure of the washing tower 30 is maintained to be lower than that of the ammonia stripper 20. Specifically, the inner pressure of the washing tower 30 is maintained to be lower than that of the ammonia stripper 20 and to be in a range from 0 to 1.5 $kg/cm^2G$.

An ammonia-containing wastewater St•1 which contains ammonia ($NH_3$) is introduced into the $CO_2.H_2S$ stripper 10 through an ammonia-containing wastewater pipe 11. The ammonia-containing wastewater St•1 is introduced via a steam heater 12 for heating of inlet wastewater.

At an upper portion of the $CO_2.H_2S$ stripper 10, a pressure gauge 13 which measures the inner pressure of the $CO_2.H_2S$ stripper 10, and a thermometer 14 which measures the inner temperature thereof, are provided.

A $CO_2.H_2S$ rich gas St•2 having been discharged from a tower top 15 of the $CO_2.H_2S$ stripper 10 is discharged to an incinerator or the like (details will be described later).

Furthermore, the $CO_2.H_2S$ stripper 10 has a pump 16 for circulation of a liquid inside the $CO_2.H_2S$ stripper 10. The liquid in the $CO_2.H_2S$ stripper 10 circulates inside the $CO_2.H_2S$ stripper 10 upwardly and downwardly by the action of the pump 16.

Furthermore, the $CO_2.H_2S$ stripper 10 has a steam heater 18 for heating of liquid in a tower bottom 17 of the $CO_2.H_2S$ stripper 10. The liquid heated by the steam heater 18 is returned to the $CO_2.H_2S$ stripper 10 after the heating.

Note that, in the middle of the $CO_2.H_2S$ stripper 10, a dam 19 for storage of liquid is disposed.

A solution St•3 from the tower bottom 17 of the $CO_2.H_2S$ stripper 10 is introduced into the ammonia stripper 20. At an upper portion of the ammonia stripper 20, a pressure gauge 21 and a thermometer 22 which are similar to those of the $CO_2.H_2S$ stripper 10 are provided.

Furthermore, the ammonia stripper 20 has a pump 23 for circulation of a liquid inside the ammonia stripper 20. The liquid inside the ammonia stripper 20 circulates inside the ammonia stripper 20 upwardly and downwardly by the action of the pump 23.

Furthermore, the ammonia stripper 20 has a steam heater 25 for heating of liquid in a tower bottom 24 of the ammonia stripper 20. The liquid heated by the steam heater 25 is returned to the ammonia stripper 20 after the heating.

Note that, in the middle portion of the ammonia stripper 20, a dam 27 for storage of liquid is disposed.

A gas from a tower top 26 of the ammonia stripper 20, that is, an ammonia-rich gas St•4 containing a small amount of $CO_2$ and $H_2S$ is introduced into the NaOH washing tower 31 of the washing tower 30.

Then, a water St•5 from the tower bottom 24 of the ammonia stripper 20 is discharged as industrial water through a steam heater 28 and a pump 29.

The washing tower 30 is integrally formed, as described above, with the NaOH washing tower 31 located below and the water washing tower 32 located above, which are vertically coupled to each other. An upper portion of the NaOH washing tower 31 communicates with the water washing tower 32 through a communicating opening 33. Note that the communicating opening 33 is formed into the shape of a dam, and forms a connecting part.

The ammonia-rich gas St•4, which contains a small amount of $CO_2$ and $H_2S$, from the tower top 26 of the ammonia stripper 20 is introduced into a lower portion of the NaOH washing tower 31 of the washing tower 30.

A solution from a tower bottom 34 circulates through a circulation pipe 36 by the action of a pump 35 and flows into the NaOH washing tower 31 of the washing tower 30. Along the circulation pipe 36, an injection pipe 37 for injection of a NaOH (sodium hydroxide) St•8 is connected so that NaOH can be injected into the NaOH washing tower 31 through the injection pipe 37.

Furthermore, the tower bottom 34 of the NaOH washing tower 31 also discharges a wastewater St•7 to a wastewater treatment facility through the pump 35.

Furthermore, the water washing tower 32 of the washing tower 30 described above has a circulation pipe 39 which connects the lower portion of the water washing tower 32 to the upper portion thereof so as to circulate liquid by the action of a pump 38. A make-up water pipe 40 which feeds a make-up water to the circulation pipe 39 as necessary is provided to feed a make-up water St•9 to the water washing tower 32.

A $H_2S$-free ammonia vapor St•6 as a product from a tower top 41 of the washing tower 30 is supplied to a desired destination to be used.

Note that coolers 45 provided downstream of the pumps 16, 23, 29, 35, and 38 are air-cooling type coolers (air coolers), but may be cooling-water type heat exchangers.

Here, Table 1 shows an example of the compositions of the fluids denoted by St•1 to St•9 when the embodiment in FIG. 1 is carried out. Note that the fluids denoted by St•1 and the like, respectively, are denoted as Stream No. 1 and the like in Table 1.

TABLE 1

|  | Stream No. 1 | Stream No. 2 | Stream No. 3 | Stream No. 4 | Stream No. 5 | Stream No. 6 | Stream No. 7 | Stream No. 8 | Stream No. 9 |
|---|---|---|---|---|---|---|---|---|---|
| $H_2O$ (g/hr) | 26,432.50 | 5 | 26,427.50 | 108.7 | 26,318.80 | 16.2 | 112.5 | 10 | 10 |
| $H_2S$ (g/hr) | 9.6 | 8.1 | 1.5 | 1.5 | 0 | 0 | 1.5 | 0 | 0 |
| $CO_2$ (g/hr) | 435.8 | 431.6 | 4.2 | 4.1 | 0.1 | 0 | 4.1 | 0 | 0 |
| $NH_3$ (g/hr) | 222.1 | 5.1 | 217 | 216.3 | 0.7 | 216.3 | 0 | 0 | 0 |
| NaOH (g/hr) | 0 | 0 | 0 | 0 | 0 | 0 | 10 | 10 | 0 |
| Total (g/hr) | 27,100.00 | 449.8 | 26,650.20 | 330.6 | 26,319.60 | 232.5 | 128.1 | 20 | 10 |
| Temperature (° C.) | 63 | 55 | 141 | 90 | 124 | 55 | 50 | 30 | 30 |
| Pressure (kg/cm$^2$G) | 5 | 2.8 | 3.1 | 1 | 1.3 | 0.5 | 0.8 | 0.6 | 0.5 |

Next, the operation of the ammonia recovery device described by referring to FIG. 1 will be described.

In FIG. 1, the ammonia-containing wastewater St•1 which contains ammonia ($NH_3$) is introduced into the $CO_2.H_2S$ stripper 10 through the ammonia-containing wastewater pipe 11 as described above.

The $CO_2.H_2S$ stripper 10 is operated while the inner pressure of the $CO_2.H_2S$ stripper 10 measured by the pressure gauge 13 is maintained at, for example, approximately 3 kg/cm$^2$G, which is higher than atmospheric pressure, and the inner temperature of the $CO_2.H_2S$ stripper 10 measured by the thermometer 14 is, for example, as low as approximately 55° C.

For this reason, with the above-described conditions of the inner pressure and the inner temperature, scattering of ammonia ($NH_3$) from the tower top 15 of the $CO_2.H_2S$ stripper 10 is prevented; the $CO_2.H_2S$ rich gas St•2 can maintain the concentration of the sum of $CO_2$ and $H_2S$ to be 90 wt % or above (Table 1) and a low moisture concentration (Table 1, the amount of $H_2O$ is 5 g/h or lower); therefore, a $CO_2.H_2S$ rich gas which contains a lesser amount of ammonia and steam can be extracted.

Thus, a tower top gas having a low moisture concentration as described above can be widely applied to gypsum recovery or sulfur recovery of an incinerator or as a raw material gas for production of sulfuric acid.

Furthermore, the tower bottom solution St•3 from the tower bottom 17 of the $CO_2.H_2S$ stripper 10 is rich in $H_2O$ and $NH_3$ (ammonia) (Table 1). This gas St•3 rich in $H_2O$ and $NH_3$ is introduced into a middle portion of the ammonia stripper 20.

The inner pressure of the ammonia stripper 20 measured by the pressure gauge 21 is maintained to be lower (normal pressure) than the pressure of the $CO_2.H_2S$ stripper 10, and the inner temperature of the ammonia stripper 20 measured by the thermometer 22 is maintained to be high (for example, approximately 90° C.).

Accordingly, the tower top gas St•4 discharged from the tower top 26 of the ammonia stripper 20 becomes rich in ammonia but contains a small amount of $CO_2$ and $H_2S$ (Table 1, $NH_3.H_2O.H_2S$ gas). The tower top gas St•4 is then sent to the NaOH washing tower 31 of the washing tower 30.

Meanwhile, the water St•5 (Table 1) which is reusable as clean industrial water is obtained from the tower bottom 24 of the ammonia stripper 20.

The tower top gas St•4 containing ammonia from which $CO_2$ and $H_2S$ have been released is an ammonia rich gas ($NH_3.H_2O.H_2S$ gas) containing a small amount of $CO_2$ and $H_2S$ as described above.

In the NaOH washing tower 31, NaOH is injected into this ammonia rich gas, that is, the circulating water St•8 (Table 1) containing NaOH is injected into the circulation pipe 36. The temperature and the pressure of the circulating water St•8 to be injected are approximately 0.6 kg/cm$^2$G at 30° C.

Figure 4:
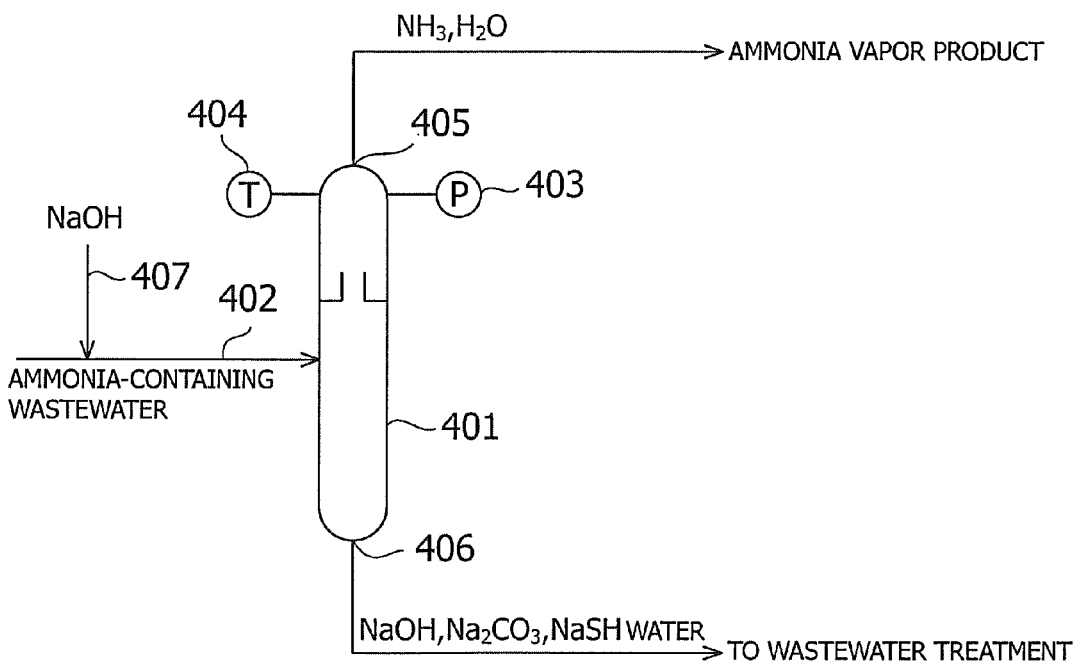
FIG. 4 is a system diagram of a main part of an ammonia recovery device according to another conventional art.

As a result, NaOH in the circulating water St•8 absorbs only the remaining $CO_2$ and $H_2S$; thus, the amount of NaOH used can be greatly reduced. For example, the amount, which is 35 tons per day in the device of the conventional art shown in FIG. 4, can be reduced to 5 tons per day in the present invention.

The gas from which the remaining $CO_2$ and $H_2S$ have been absorbed by NaOH in the NaOH washing tower 31 is an ammonia vapor containing a small amount of steam. With this gas flowing into the water washing tower 32 located immediately above the NaOH washing tower 31, a water washing process is performed in which the make-up water St•9 is supplied through the make-up water pipe 40 into the water washing tower 32 so that dispersion of droplets of NaOH can be washed off. The temperature and the pressure of the make-up water St•9 to be injected are approximately 0.5 kg/cm$^2$G at 30° C.

Furthermore, the tower bottom 34 of the washing tower 30 communicates with a wastewater treatment facility through the pump 35. The wastewater St•7 (Table 1) is a water containing a sodium compound, such as $Na_2CO_3$ and NaSH.

As a result, the gas St•6 (Table 1) discharged from the tower top 41 of the washing tower 30 is a $H_2S$-free gas rich in ammonia, and thereby preferably used as an ammonia vapor product.

Figure 2:
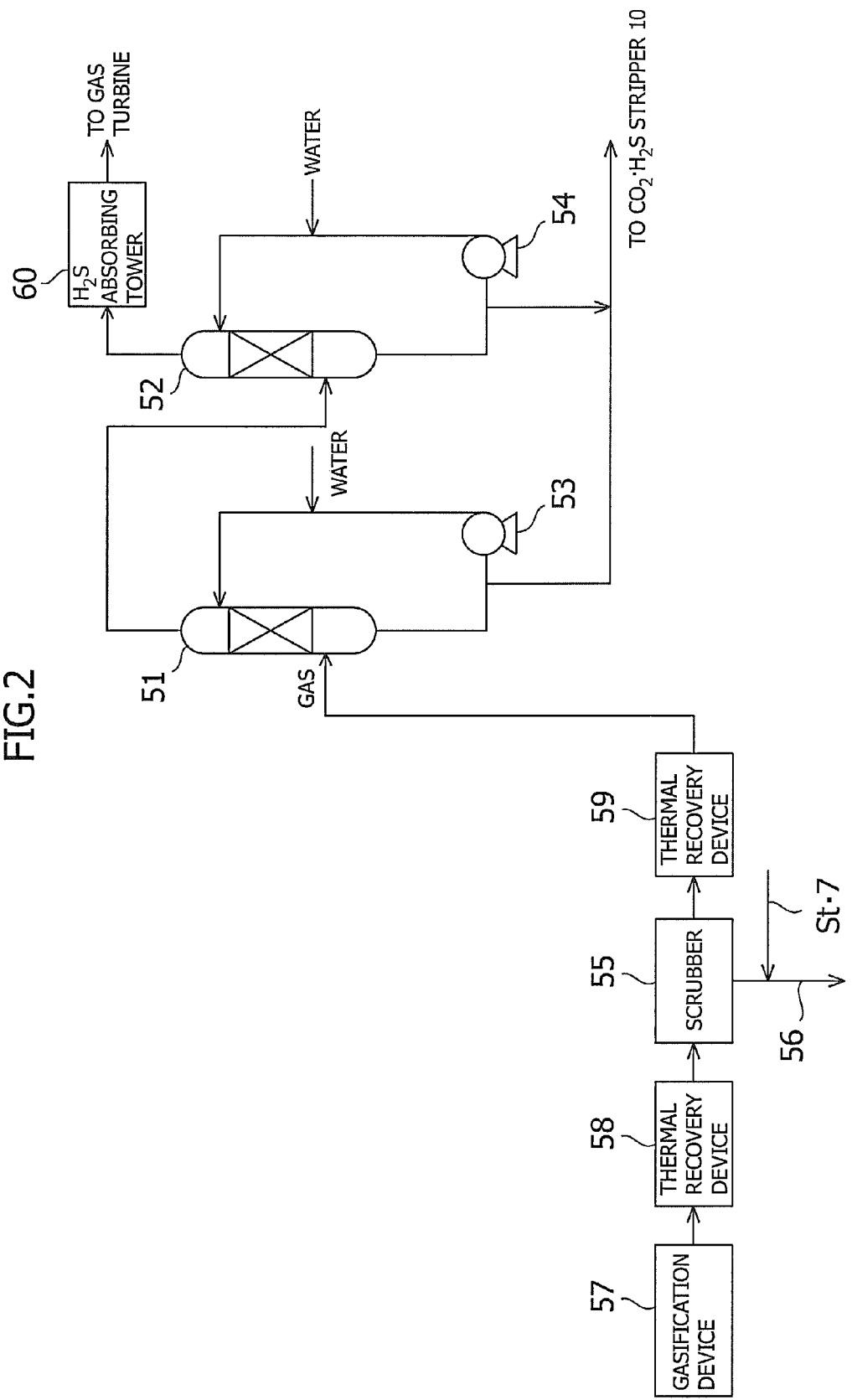
FIG. 2 is a system diagram describing an embodiment of a system to which the device for recovering ammonia from an ammonia-containing wastewater according to the present invention is applied.
Figure 3:
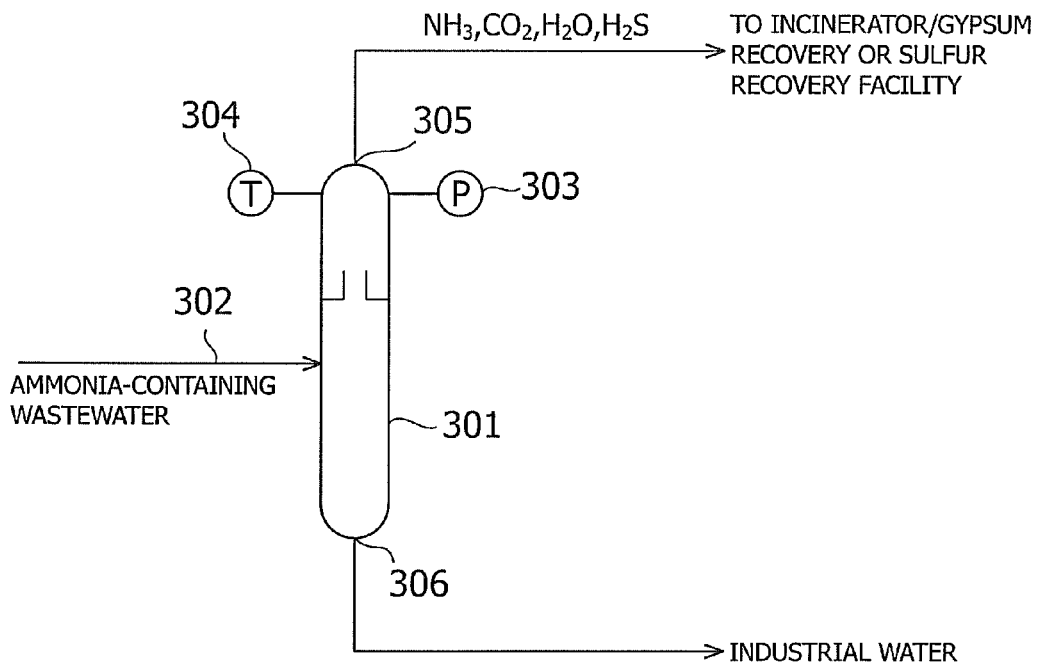
FIG. 3 is a system diagram of a main part of an ammonia recovery device according to a conventional art.

FIG. 2 shows one form of a preceding system which generates an ammonia-containing wastewater to be treated by the ammonia recovery device according to the present invention.

As shown in FIG. 2, a gasified gas generated in a coal gasification device 57 is thermally recovered in thermal recovery devices 58 and 59. Between these thermal recovery devices 58 and 59, a scrubber 55 is disposed. Thermally recovered gas (made of $CO_2$, CO, $H_2$, $N_2$, $NH_3$, $H_2S$, and the like) is introduced into a gas cooling tower 51.

The gas subjected to a cooling treatment in the gas cooling tower 51 is introduced into a gas washing tower 52 to be subjected to a washing treatment, and then introduced into a gas turbine through a $H_2S$ absorbing tower 60.

In the meantime, wastewaters from tower bottom portions of the gas cooling tower 51 and the gas washing tower 52 circulate by the actions of pumps 53 and 54, respectively. Then, a certain amount of the wastewater is sent as an ammonia-containing wastewater to the $CO_2.H_2S$ stripper 10 described in FIG. 1.

In this case, the wastewater St•7 from the tower bottom 34 of the washing tower 30 can be supplied to a wastewater passage 56 of the scrubber 55. In this way, it is possible to neutralize a harmful acidic constituent (chlorine, F, or the like) included in the scrubber 55 with the above-described Na compound remaining in the wastewater St•7.

Hereinabove, an embodiment of the present invention has been described; however, the present invention is not limited to the described embodiment, and various changes and modifications are possible based on the technical concepts of the present invention.

The disclosure of Japanese Application No. 2009-243169 filed on Oct. 22, 2010 including specification, claims, drawings and abstract thereof is incorporated herein by reference in its entirety.

What is claimed is:

1. An ammonia recovery device for recovering ammonia from an ammonia-containing wastewater from a gasification furnace, the ammonia recovery device comprising:
   a $CO_2.H_2S$ stripper configured for maintaining an inner pressure higher than atmospheric pressure;
   an ammonia stripper configured for maintaining an inner pressure lower than that of the $CO_2.H_2S$ stripper; and
   a washing tower configured for maintaining an inner pressure maintained lower than that of the ammonia stripper; wherein
   the $CO_2.H_2S$ stripper has:
      a tower top portion configured for the discharge of $CO_2$ and $H_2S$ gas; and
      a tower bottom portion configured for the discharge of a solution containing ammonia;
   the ammonia stripper has:
      a tower top portion configured for the discharge of a gas rich in ammonia;
      a connection to the tower bottom portion of the $CO_2.H_2S$ stripper configured for introducing the solution containing ammonia discharged from the $CO_2.H_2S$ stripper; and
      a tower bottom portion configured for discharging a water reusable as industrial water; and
   the washing tower includes:
      a water washing tower located above; and
      a NaOH washing tower located below which are coupled to each other, the NaOH washing tower has:
         a connection to the tower top portion of the ammonia stripper configured for introducing a gas rich in ammonia discharged from the ammonia stripper;
         a connecting part to the water washing tower located above the NaOH washing tower configured for sending the gas rich in ammonia after treatment with NaOH in a circulating water to absorb $H_2S$ and $CO_2$;
         a tower bottom portion configured for the discharge of a wastewater containing a Na compound;
         a circulation pipe configured for the circulation of a solution from the tower bottom back into the NaOH washing tower by the action of a pump; and an injection pipe connected to the circulation pipe configured for the injection of NaOH into the NaOH washing tower through the injection pipe, and the water washing tower has a tower top portion configured for the discharge of a purified gas rich in ammonia after a make-up water is supplied to the gas rich in ammonia sent through the connecting part of the NaOH washing tower so as to wash with the make-up water.

* * * * *